(12) United States Patent
Chakravarthy

(10) Patent No.: US 7,681,786 B1
(45) Date of Patent: Mar. 23, 2010

(54) SYSTEM AND METHOD FOR IMPROVED TREATMENT OF ERROR CONDITIONS IN TRANSACTION SYSTEMS

(75) Inventor: Sriram Chakravarthy, San Jose, CA (US)

(73) Assignee: Rearden Commerce, Inc., Foster City, CA (US)

( * ) Notice: Subject to any disclaimer, the term of this patent is extended or adjusted under 35 U.S.C. 154(b) by 517 days.

(21) Appl. No.: 11/395,020

(22) Filed: Mar. 31, 2006

(51) Int. Cl.
*G06F 17/00* (2006.01)
(52) U.S. Cl. ...................................... 235/375
(58) Field of Classification Search .................. 235/375
See application file for complete search history.

(56) References Cited

U.S. PATENT DOCUMENTS

2004/0078247 A1* 4/2004 Rowe et al. ................... 705/4
2004/0098269 A1* 5/2004 Wise et al. ..................... 705/1
2004/0226002 A1* 11/2004 Larcheveque et al. ....... 717/126

\* cited by examiner

*Primary Examiner*—Jamara A Franklin
(74) *Attorney, Agent, or Firm*—Greenberg Traurig, LLP

(57) ABSTRACT

A method, that may be implemented on a system, for improved treatment of error conditions in transactions systems, is described. One embodiment includes providing a transaction form to a user in response to receiving a user requests for a transaction form; in response to receiving a form at least partially completed by the user, storing on a data storage unit data entered on the form; informing the user of an error associated with submission of the form; providing the user with a first option of retrying to submit the form; and in response to the user opting to retry submission of the form, reposting from the data storage unit the data from the user previously entered on the form.

24 Claims, 3 Drawing Sheets

SYSTEM AND METHOD FOR IMPROVED TREATMENT OF ERROR CONDITIONS IN TRANSACTION SYSTEMS

BACKGROUND OF THE INVENTION

When a user attempts to interact with a services transaction system as is known to the inventor, it may happen that instead of the anticipated interaction resulting in some desired transaction, the user, after entering the data required to request a service transaction, receives an error message and is unable to complete the transaction. In current art, the only offered options for dealing with such error conditions are typically Retry and Abort (Cancel), and nothing else. The user experience is even more adverse in case the services that are procured asynchronously (where the user gets notified of the status of the transaction at a later point of time). In such cases, the current art, the only offered option is to let the user know the transaction has failed and get them to create a new request. If the error condition stems, for example, from a problem in a communication line, retrying continually does not produce any results other than continual errors, because the line is not going to be fixed by the user retrying. Thus the user must cancel the interaction and consequently loses all the data he has entered, resulting in wasted time and effort and considerable frustration.

What is clearly needed is a system and method for that offers more effective options for treatment of error conditions than the typical selection of Retry or Cancel options.

SUMMARY

A method, that may be implemented on a system, for improved treatment of error conditions in transactions systems, is described. One embodiment includes providing a transaction form to a user in response to receiving a user requests for a transaction form; in response to receiving a form at least partially completed by the user, storing on a data storage unit data entered on the form; informing the user of an error associated with submission of the form; providing the user with a first option of retrying to submit the form; and in response to the user opting to retry submission of the form, reposting from the data storage unit the data from the user previously entered on the form.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
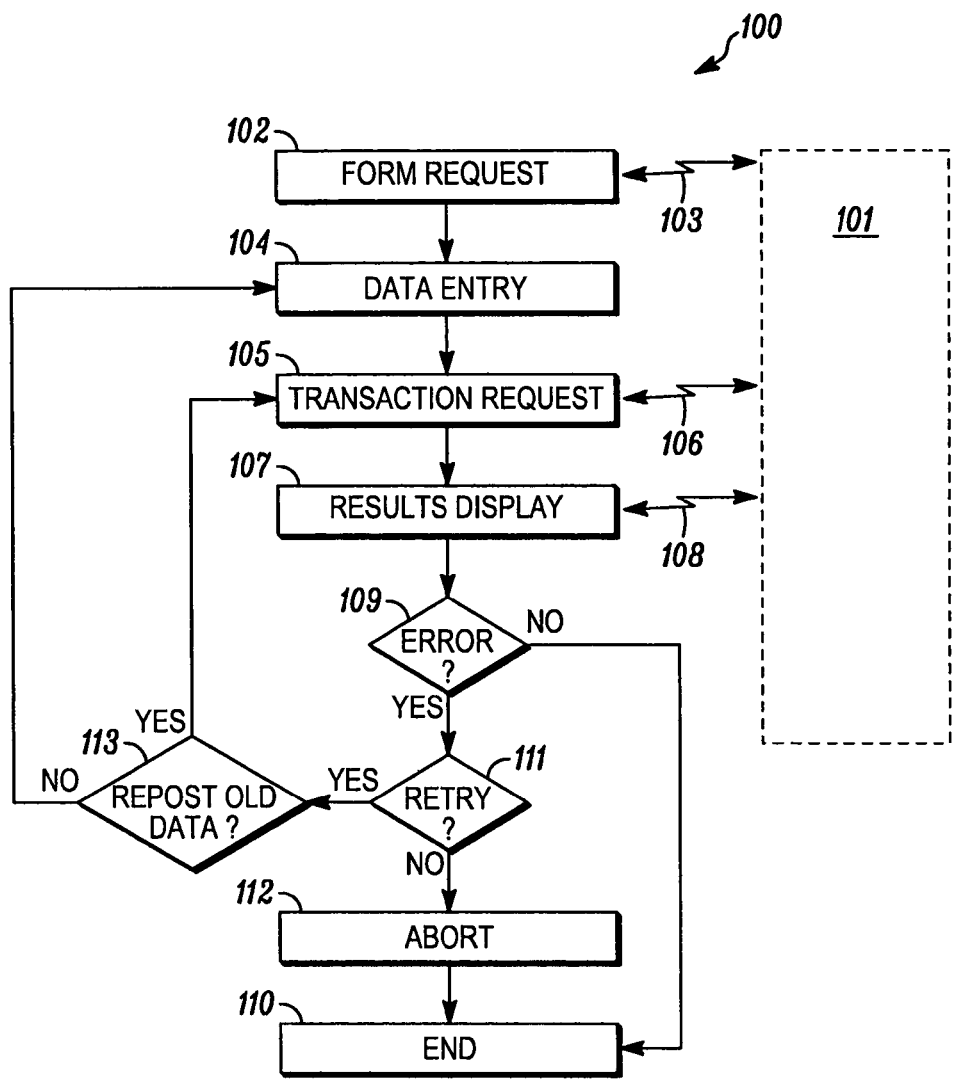
FIG. 1 shows a process flow of a typical error handling system as known in current art.

FIG. 1 shows a process flow 100 of a typical error handling system as known in current art. In step 102, a user requests a transaction form via interaction 103 with transaction system 101, which replies via the same interaction 103, displaying a form on the screen (not shown) of the user. In step 104, a user typically enters data in the form, and in step 105, the user sends the completed form via transaction 106 back to transaction system 101. Then in step 107, the system returns transaction results via interaction 108, which results are displayed to the user. In step 109, the process branches. If no error has occurred in the process (no), the process ends at step 110. If, however, an error has occurred in the process (yes), the process moves to step 111, where the user may be offered the option to retry. Some web sites may tell the user not to retry, or some web sites tell the user to wait for a specified time before retrying. But in any case, if a retry is not offered (no), the transaction is aborted in step 112 and the interaction ends in step 110. If a retry is indeed offered in step 111 (yes), the process moves to step 113, where the process again branches. In some cases the data that the user entered remains in the form (yes), and the process loops back to step 105, where the user may again request a transaction. If, however, the data that the user entered does not remain in the form (no), the process loops back to step 104, where the user must re-enter his data, and then attempt the transaction. It is clear that this process is cumbersome and places the burden of dealing with the problems of the transaction system on the user in a time-consuming manner.

Figure 2:
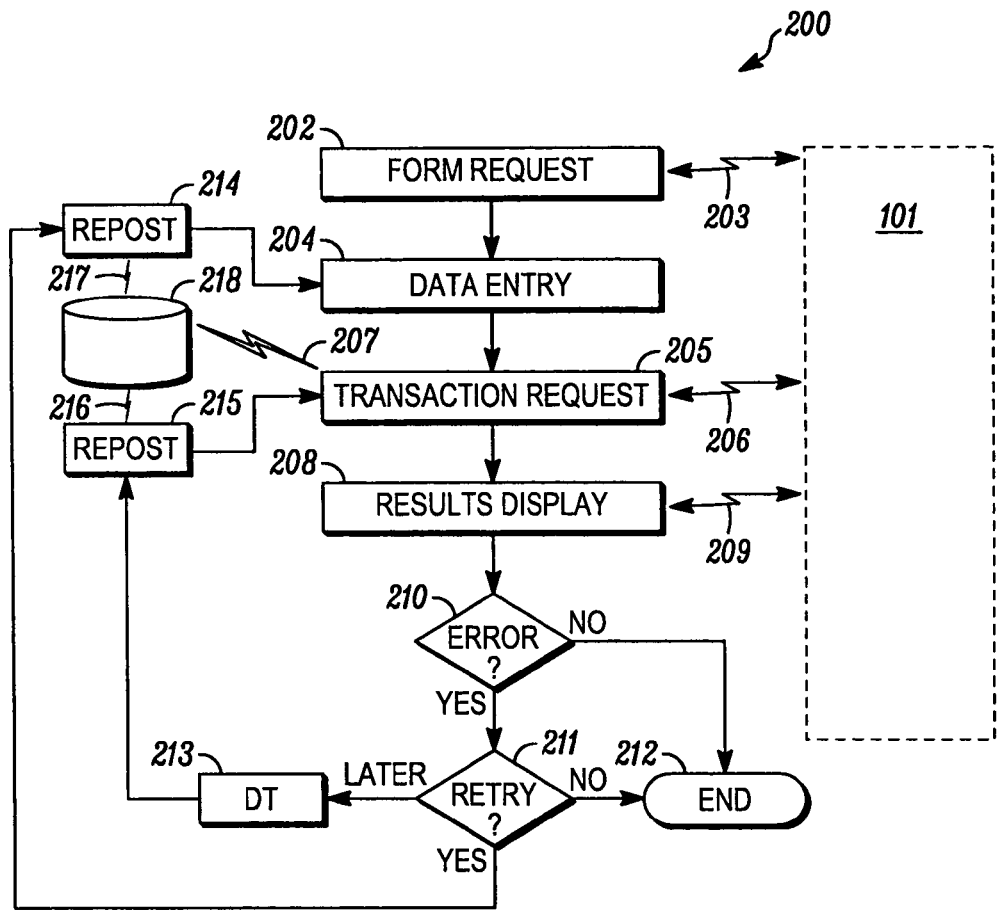
FIG. 2 shows a process flow of an enhanced error handling system according to one aspect of the present embodiment.

FIG. 2 shows a process flow 200 of an enhanced error handling system according to one aspect of the present embodiment. Such an enhanced system may, for example, give the user some information about the nature of the problem and the anticipated time until it is corrected (e.g., the communication line may be fixed after an hour) and may offer the user the option to retry the interaction in one hour, with his entered data safely saved. Thus the user can turn to some other task, without losing the data he entered and with a known time for completing the transaction. In step 202, a user requests a transaction form via interaction 203 with transaction system 101, which replies via the same interaction 203, displaying a form on the screen (not shown) of the user. In step 204, the user enters data, and in step 205 the user sends the transaction request with data to system 101 via interaction 206 and also to local data storage 218 via interaction 207. In step 208 the system 101 returns transaction results via interaction 209, which results are displayed to the user. At step 210, the process branches. If there is no error (no), the transaction ends at step 212. If, however, an error occurs (yes), the process moves to step 211, where the user may be offered various options. If the user accepts the option not to retry (no), the process terminates at step 212. If the user decides to retry (yes), his data is reposted in step 214 from local data storage 218 via interaction 217. In other cases, for example, the system may give the user the option of automatically completing the transaction at some future time (later). The user may wish to select this option if, for example, there is a problem in a communication line, which problem is anticipated to be corrected within an hour, or a server is down for maintenance for the next two hours. In step 213 a timer is activated. In some cases, the user may select a time interval, or in other cases, the system may schedule this time interval without user intervention. When the scheduled time has elapsed, in step 215 data is reposted via interaction 216 with local storage 218. The process then continues from step 205. The continued process may occur automatically without user intervention, with transaction results displayed in step 208. It is clear that this process may include such options as repeated retries; for example, in step 213 the timer may be set to retry every half hour for up to 24 hours, etc.

Yet another option that is provided by the system in some of these cases, is to automatically "retry to procure the service" on behalf of the user. In this case the system retries the request as soon as it detects the problems that caused transaction failure (connectivity issues etc) are resolved. The system can also set the retry interval based on the historical provider downtime data. So for instance, if it is known that on an average the provider downtime lasts for 15 minutes, the system can auto-configure to retry after this period. If the user chooses to let the system "automatically retry" on their behalf, they are notified (via email or other user desired means to get notified) when the transaction succeeds.

Figure 3:
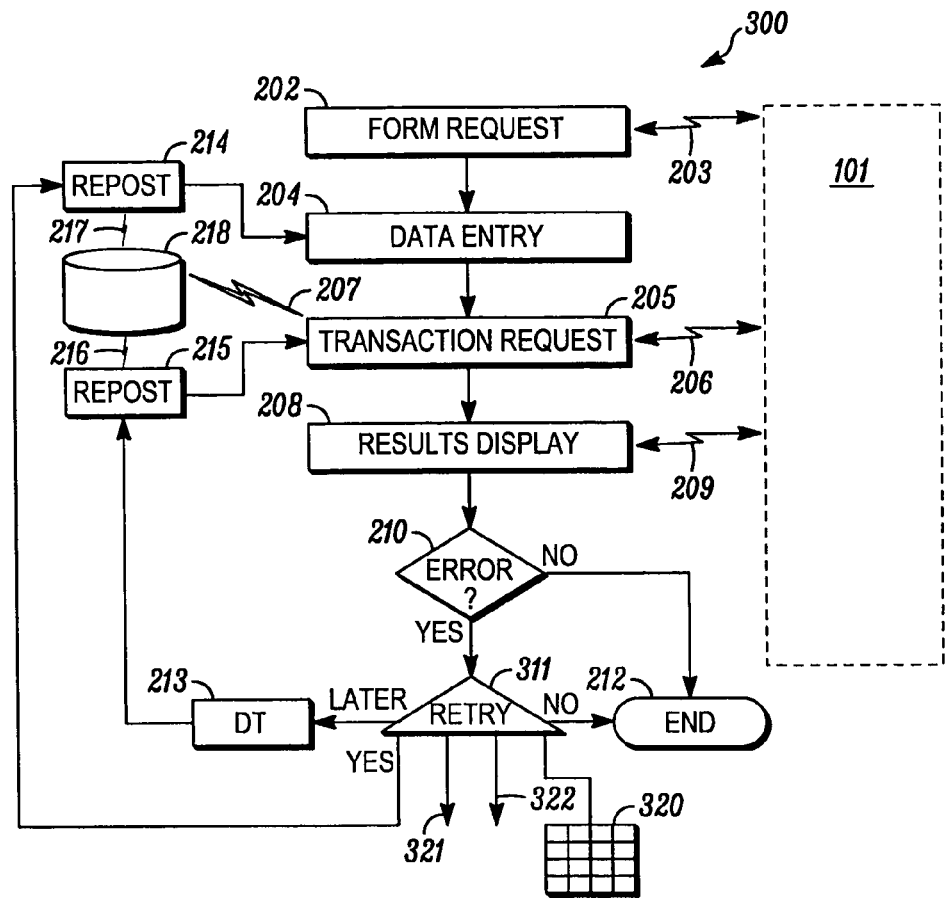
FIG. 3 shows a further enhanced process flow according to another aspect of the present embodiment.

FIG. 3 shows a further enhanced process flow 300 according to another aspect of the present embodiment. In step 311, the system offers multiple options that could invoke additional processes, such as, for example, escalation to a call center where urgent transactions could be handled by an agent, or faxing, as indicated by exemplary arrows 321 and 322. A table 320 may contain data about the transaction type, the kind of error condition, and time frame until the problem is correct. The system may use the data in table 320 to decide which options to offer the user, what retry time frame to offer, and what other solutions to offer in addition to simply ending the transaction. Said other solutions may include, for example, sending a fax of the transaction data to a main office in case of a downed communication line, calling the transaction data in to a call center, using a voice portal, or any of other data communication means known in the art. Appendix A is an example of a document that could be the base for or converted into a table such as table 320.

Figure 4:
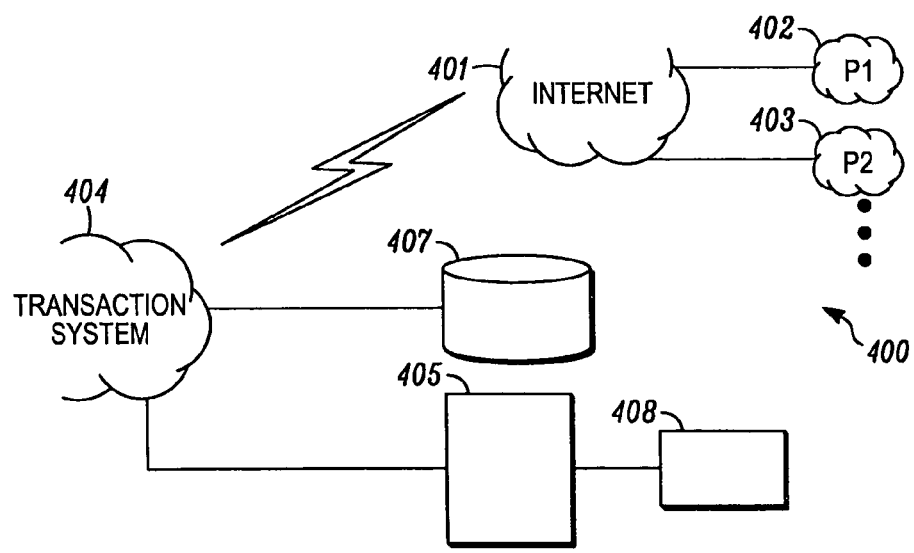
FIG. 4 illustrates an overview of a system, in accordance with one embodiment

FIG. 4 shows an overview of such an enhanced system 400 according to the present embodiment. Transaction system 404, which is a part of system 101, as described above, may be connected via some type of network connection such as, for example, Internet 401 to providers P1 402 and P2 403 (there can be many providers; for reasons of simplicity and clarity, only two exemplary providers are shown). Server 405 may contain a software instance 406 of the enhanced system and method of the present embodiment. Storage 407 may store the data for the enhanced system and method of the present embodiment, as well as, optionally, for many other processes.

It is clear that many modifications and variations of this embodiment may be made by one skilled in the art without departing from the spirit of the novel art of this disclosure.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EE-PROM's); and electrical, optical, acoustical and other forms of propagated signals (e.g., carrier waves, infrared signals, digital signals, etc.); etc.

What is claimed is:

1. A computer implemented method comprising:
    providing, via a computing device, a transaction form from a transaction system;
    receiving, via the computing device, data from a user for at least partially completing the form;
    causing, via the computing device, the data from the user to be stored on a local data storage unit;
    receiving, via the computing device, the form with the data at the transaction system;
    informing, via the computing device, the user of an error associated with submission of the form;
    providing, via the computing device, the user with a first option of retrying to submit the form;
    in response to the user opting to retry submission of the form, causing, via the computing device, the data from the local data storage unit to be reposted and receiving a resubmitted form at the transaction system;
    receiving, via the computing device, selection by the user of a pre-determined period of delay; and
    following the pre-determined period of delay elapsing, automatically causing, via the computing device, the data from the local data storage unit to be reposted and receiving the resubmitted form, without user intervention.

2. The method of claim 1, wherein the first option of retrying to submit the form is to be performed immediately.

3. The method of claim 2, further comprising providing the user with a second option of automatically retrying to submit the form following a delay.

4. The method of claim 3, further comprising informing the user the error is related to a problem in a communication media.

5. The method of claim 1, further comprising prompting the user to select a period of delay to elapse prior to retrying submission of the form.

6. The method of claim 1, further comprising, following elapse of the period of delay, continually repeating the automatically causing the reposting the data and the receiving the resubmitted form.

7. The method of claim 6, further comprising providing the user information about a nature of the error and an anticipated delay until the error is corrected.

8. The method of claim 7, further comprising notifying the user when submission of the form is successful.

9. The method of claim 1, further comprising providing the user with a second option of, in response to detecting that the error is resolved, automatically reposting the data from the local data storage unit and resubmitting the form.

10. The method of claim 1, wherein the period of delay is selected based on historical downtime data.

11. A machine readable medium having stored thereon a set of instructions which, when executed, perform a method comprising:
    providing a transaction form from a transaction system;
    receiving data from a user for at least partially completing the form;
    causing the data from the user to be stored on a local data storage unit;
    receiving the form with the data at the transaction system;
    informing the user of an error associated with submission of the form;
    providing the user with a first option of retrying to submit the form;

in response to the user opting to retry submission of the form, causing the data from the local data storage unit to be reposted and receiving a resubmitted form at the transaction system;

receiving selection by the user of a pre-determined period of delay; and following the pre-determined period of delay elapsing, automatically causing, via the computing device, the data from the local data storage unit to be reposted and receiving the resubmitted form, without user intervention.

12. The machine readable medium of claim 11, wherein the first option of retrying to submit the form is to be performed immediately.

13. The machine readable medium of claim 12, further comprising providing the user with a second option of automatically retrying to submit the form following a delay.

14. The machine readable medium of claim 13, further comprising, following elapse of the delay, reposting the data from the local data storage unit and receiving the resubmitted the form.

15. The machine readable medium of claim 14, further comprising prompting the user to select a period of delay to elapse prior to retrying submission of the form.

16. The machine readable medium of claim 13, further comprising informing the user the error is related to a problem in a communication media.

17. A computer system comprising:

at least one server for:

providing a transaction form from a transaction system;

receiving data from a user for at least partially completing the form;

causing the data from the user to be stored on a local data storage unit;

receiving the form with the data at the transaction system;

informing the user of an error associated with submission of the form;

providing the user with a first option of retrying to submit the form;

in response to the user opting to retry submission of the form, causing the data from the local data storage unit to be reposted and receiving a resubmitted form at the transaction system;

receiving selection by the user of a pre-determined period of delay; and following the pre-determined period of delay elapsing, automatically causing, via the computing device, the data from the local data storage unit to be reposted and receiving the resubmitted form, without user intervention.

18. A computer implemented method comprising:

providing, via a computing device, a transaction form from a transaction system;

receiving, via the computing device, data, entered by a user, for the transaction form;

causing, via the computing device, the data to be stored on a local data storage unit;

receiving, via the computing device, a transaction request with the data at the transaction system;

informing, via the computing device, the user of an error associated with the transaction request;

providing, via the computing device, the user with an option of retrying the transaction request;

in response to the user accepting the option, causing, via the computing device, the data from the local data storage unit to be reposted and receiving resubmitted data at the transaction system;

receiving, via the computing device, selection by the user of a pre-determined period of delay; and following the pre-determined period of delay elapsing, automatically causing, via the computing device, the data from the local data storage unit to be reposted and receiving the resubmitted form, without user intervention.

19. The method of claim 18, wherein the reposting the data and the resubmitting the data are performed after a period of delay selected by the user.

20. The method of claim 18, wherein the reposting the data comprises repeatedly reposting the data from the local data storage unit and resubmitting the data to the transaction system based on a time interval.

21. The method of claim 20, wherein the time interval is selected by the user.

22. The method of claim 20, wherein the time interval is based on historical provider downtime data.

23. The method of claim 20, further comprising presenting information to the user comprising a nature of the error and an anticipated delay until the error is corrected.

24. The method of claim 20, wherein the error is one or more of a downed communication line or a downed server.

* * * * *